(12) United States Patent
Tsai et al.

(10) Patent No.: US 6,373,049 B1
(45) Date of Patent: Apr. 16, 2002

(54) KNOCK MODE SCANNING NEAR-FIELD OPTICAL MICROSCOPE

(75) Inventors: Din-Ping Tsai, Taichung; Shih-Che Lo, I Lan Hsien; Yun-Hui Chang, Taipei Hsien; Shih-Chou Chen, Hsin Chu; Yuan-Ying Lu, Taipei Hsien; Chi-Wen Yang, Yun Lin Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/369,373

(22) Filed: Aug. 6, 1999

(30) Foreign Application Priority Data

May 3, 1999 (TW) .......................................... 88107100

(51) Int. Cl.$^7$ .............................. H01J 3/14; H01J 37/04
(52) U.S. Cl. ...................................... 250/234; 250/306
(58) Field of Search ............................ 250/234, 201.3, 250/306, 307; 369/127; 73/105; 310/354, 355

(56) References Cited

U.S. PATENT DOCUMENTS

| | | | | |
|---|---|---|---|---|
| 5,641,896 A | * | 6/1997 | Karrai | 73/105 |
| 5,796,909 A | * | 8/1998 | Islam | 385/147 |
| 5,886,532 A | * | 3/1999 | Hsu et al. | 324/635 |
| 5,894,349 A | * | 4/1999 | Harris et al. | 356/372 |
| 5,939,709 A | * | 8/1999 | Ghislain et al. | 250/216 |
| 5,990,477 A | * | 11/1999 | Tomita | 250/306 |
| 6,046,448 A | * | 4/2000 | Sato et al. | 250/234 |
| 6,194,711 B1 | * | 2/2001 | Tomita | 250/234 |
| 6,201,227 B1 | * | 3/2001 | Tomita | 250/201.3 |

* cited by examiner

*Primary Examiner*—Frank G. Font
*Assistant Examiner*—Michael P. Stafira
(74) *Attorney, Agent, or Firm*—Browdy and Neimark P.L.L.C.

(57) ABSTRACT

A knock mode scanning near-field optical microscope comprises a light source member, an optical fiber probe connected at one end thereof with the light source member such that other end of the optical fiber probe forms a near-field point source of light, and that the optical fiber probe is attached with one end of a suspension arm member of an oscillation member. The oscillation member further has a piezoelectric ceramics, which is disposed on the suspension arm member, and is driven by a harmonic wave signal by a signal feedback member so as to bring about a change in amplitude and phase of the optical fiber probe in order to result in a feedback control.

12 Claims, 7 Drawing Sheets

KNOCK MODE SCANNING NEAR-FIELD OPTICAL MICROSCOPE

FIELD OF THE INVENTION

The present invention relates generally to a near-field optical technology, and more particularly to a knock mode scanning near-field optical microscope controlled by a highly-sensitive near-field distance.

BACKGROUND OF THE INVENTION

As shown in FIG. 1, a shear force mode scanning near-field optical microscope of the prior art comprises a light source member 1, an optical fiber probe 2, an oscillation member 3, and a signal feedback member 4. The light source member I serves as a light source of the optical fiber probe 2. The optical fiber probe 2 is driven by the oscillation member 3 such that the amplitude and the phase are changed due to the interaction force between the tip of the probe 2 and the surface of a sample 7, and Van der Waals, at the time of resonance frequency and at the time when the probe 2 comes in contact with the surface of the sample 7. The feedback control is brought about by the signal feedback member 4 so as to regulate the height (nm) of the probe 2 on the surface of the sample 7, thereby resulting in the formation of a near-field optical image of the sample 7.

The oscillation member 3 is formed of a forked pillar 5 and a piezoelectric ceramics 16. The forked pillar 5 is attached to the optical fiber probe 2 in the direction of the longitudinal axis of the forked pillar 5. In other words, the forked pillar 5 has a short axis face 8 by means of which the surface of the sample 7, the action force of the tip of the probe 2 and Van der Walls are sensed. As a result, the short axis face 8 is burdened with a shear force mode load. In light of the small area of the short axis face 8 of the forked pillar 5, the short axis face 8 is burdened with a relatively small external force. (Assuming that the load remains unchanged, the external force is in a direct proportion to the area.). In the resonance operation, the amplitude is relatively small. The amplitude is directly proportional to an external force energy stored in the probe 2. As a result, it has a relatively low sensitivity. In the meantime, the rigidity of the entire structure is greater in light of the optical fiber probe 2 and the entire forked pillar 5 being attached along the direction of the longitudinal axis of the forked pillar 5. However, the structure has become less sensitive to the oscillation brought about by an external force.

As shown in FIG. 2, the shear force mode near-field optical microscope of the prior art is exposed to air at the time when the microscopic operation of the sample 7 by the microscope is under way. Under the condition of resonance frequency and in the figure showing the relationship between the peak of amplitude and the sample height, it is observed that the amplitude is smallest at the time when the probe 2 comes in contact with the sample 7. The amplitude change zone is defined as an interaction zone with the change value ranging between 10% and 90%. The interaction zone is divided into a first section with 66 nm conversion interaction zone and with a considerably low sensitivity (inclination), and a second section with 9 nm conversion interaction zone and with a sensitivity of about 0.02 V/nm, which is considerably low. This implies that the shear force mode scanning near-field optical microscope of the prior art has a poor sensitivity and is thus incapable of a precision feedback control.

SUMMARY OF THE INVENTION

The primary objective of t he present invention is therefore to provide a knock mode scannin near-field optical microscope having an excellent sensitivity and capable of a precision feedback control.

In keeping with the principle of the present invention, the foregoing objective of the present invention is attained by a knock mode scanning near-field optical microscope, which comprises a light source member, an optical fiber probe, an oscillation member, and a signal feedback member. The optical fiber probe is connected at one end thereof with the light source member such that other end of the optical fiber probe forms a near-field point source of light. The oscillation member is formed of a piezoelectric ceramics and a suspension arm which is attached at one end thereof with the optical fiber probe. The piezoelectric ceramics is mounted on the suspension arm. The signal feedback member uses a harmonic wave signal to drive the piezoelectric ceramics so as to bring about a change in the amplitude and the phase of the optical fiber probe, thereby resulting in a feedback control.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
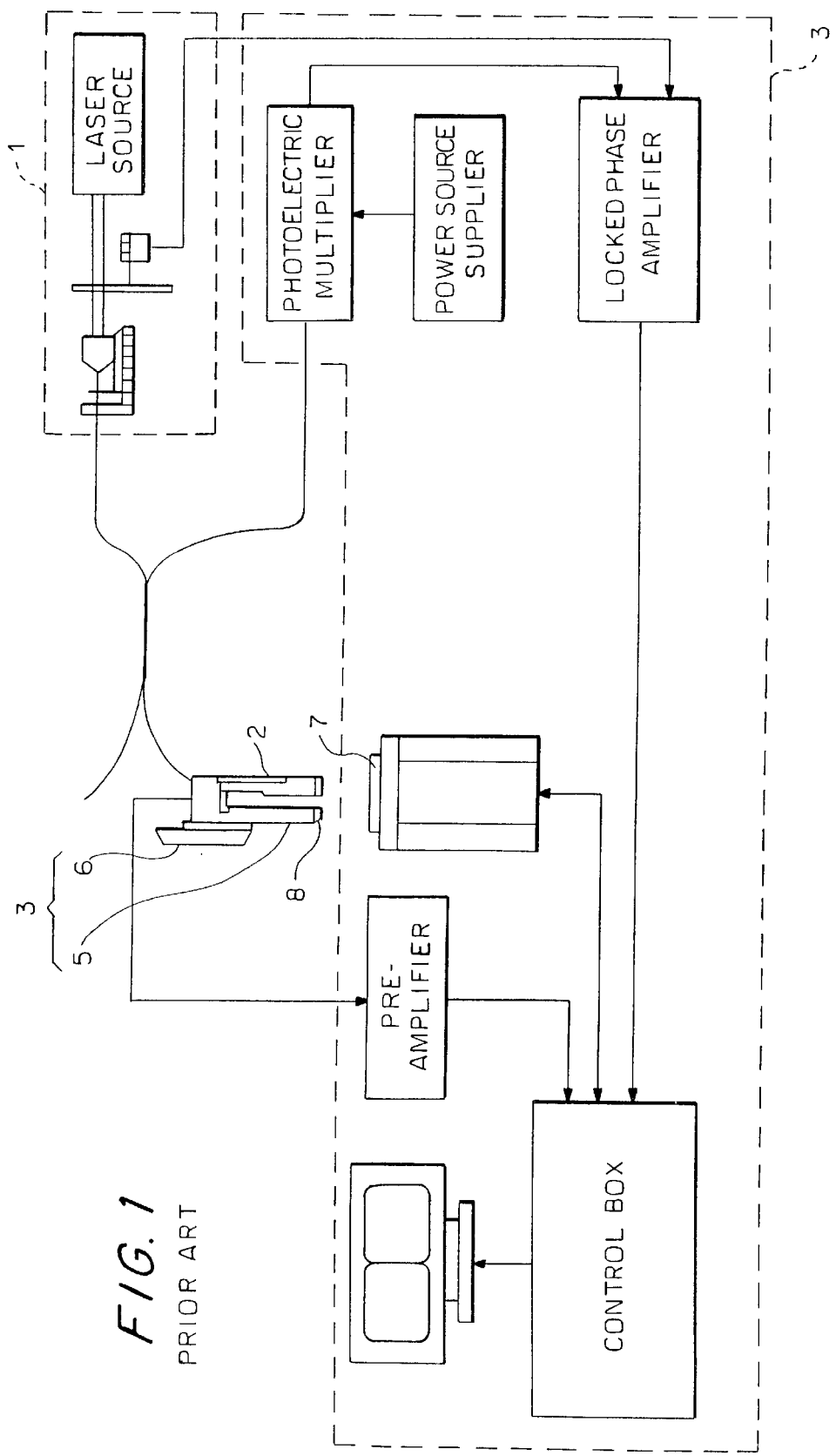
FIG. 1 shows a schematic view of a shear force mode scanning near-field optical microscope of the prior art.
Figure 2:
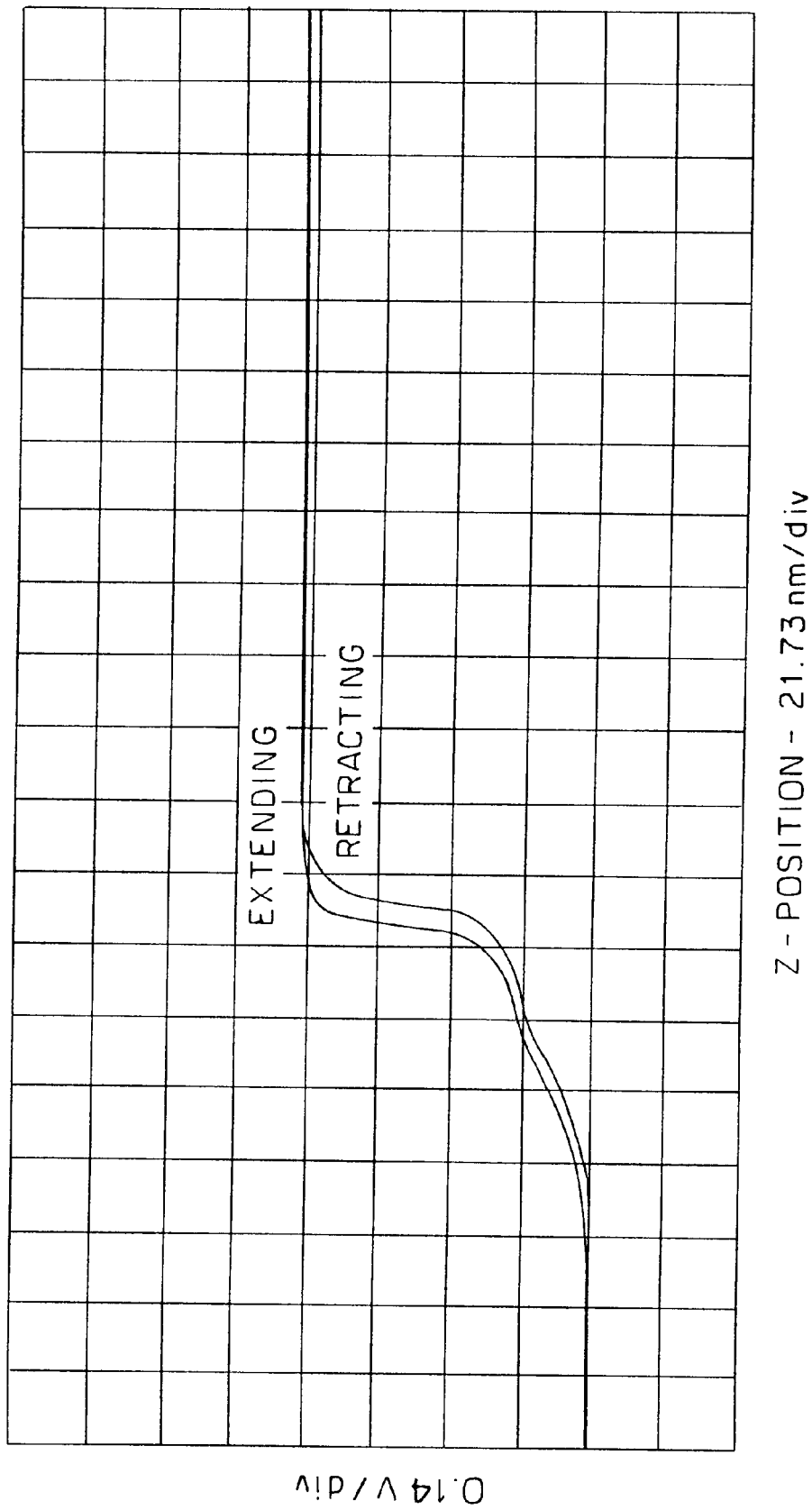
FIG. 2 shows a relationship between amplitude peak and probe distance sample height of the prior art shear force mode scanning near-field optical microscope in air and under resonance frequency.
Figure 3:
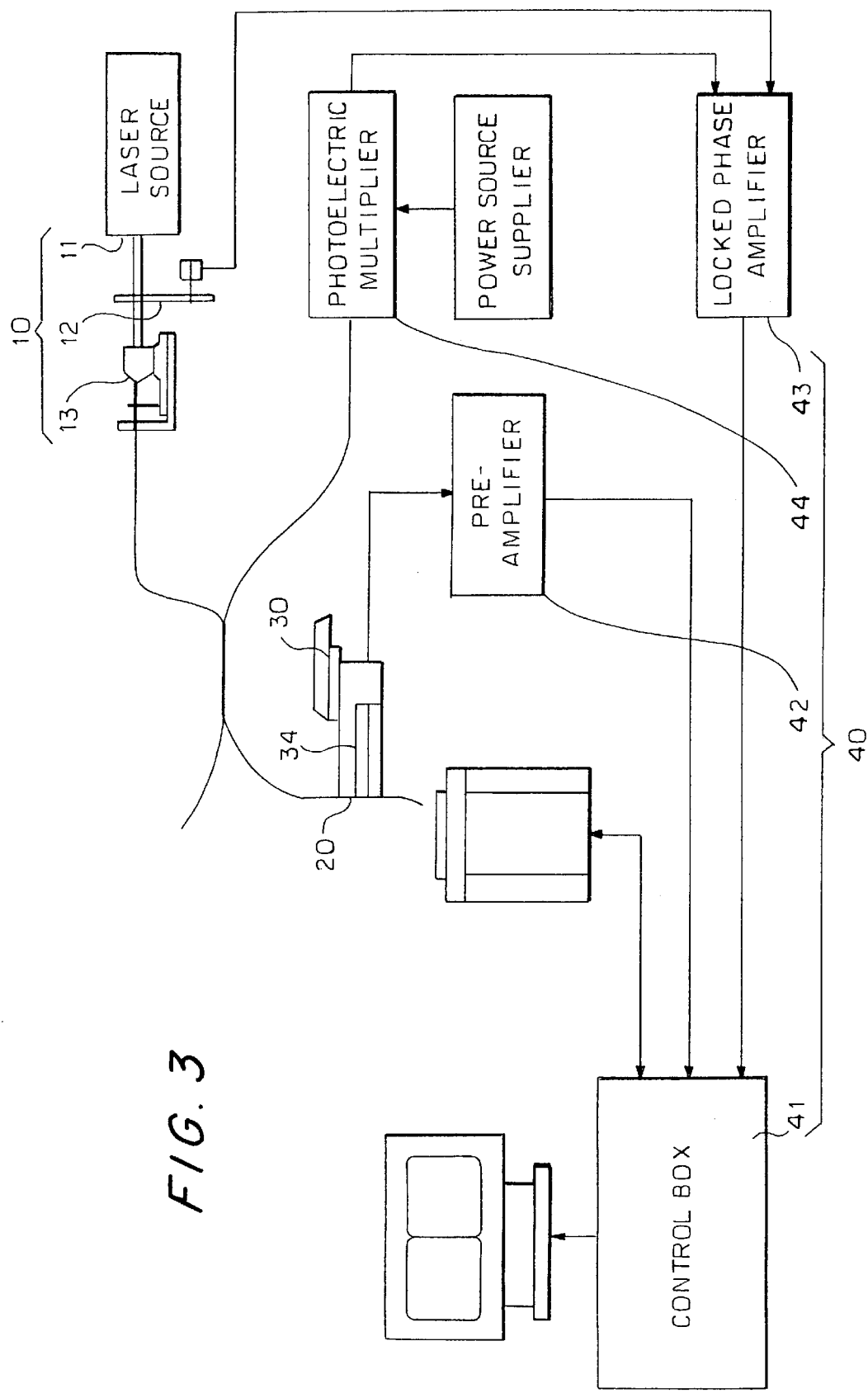
FIG. 3 shows a schematic view of a knock mode scanning near-field optical microscope of the present invention.
Figure 4:
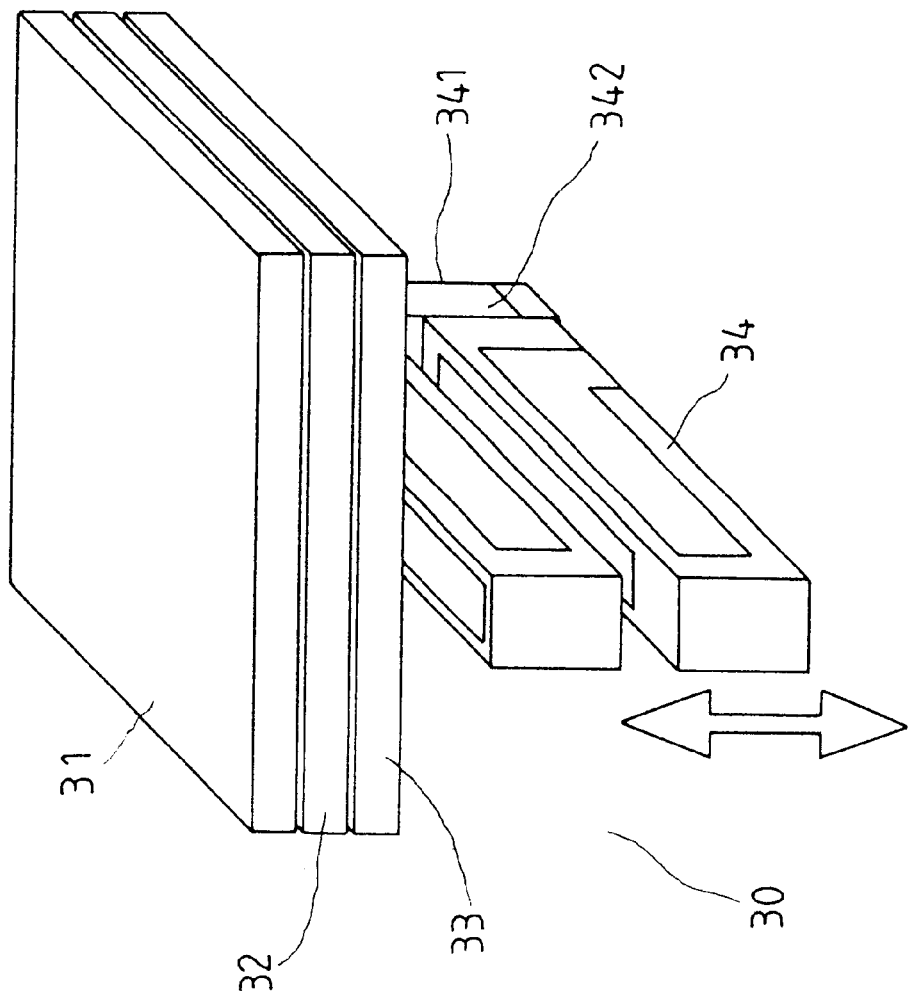
FIG. 4 shows an enlarged view of the oscillation member of the optical microscope of the present invention.

As shown in FIGS. 3 and 4, a knock mode near-field optical microscope embodied in the present invention comprises a light source member 10, an optical fiber probe 20, an oscillation member 30, and a signal feedback member 40.

The light source member 10 comprises a laser source 11, which is guided via a shield 12 and an optical fiber coupler 13 to an optical fiber probe 20 for near-field optical use.

The optical fiber probe 20 is provided with a light source by the light source member 10 such that a pointed end of the probe 20 forms a near-field point source of light.

The oscillation member comprises a piezoelectric bimorph 31, a magnet 32, an iron piece 33, and a suspension arm member 34. The magnet 32 has one end surface to which the piezoelectric bimorph 31 is attached by an adhesive, and other end surface attracting the iron piece 33 to form a superimposing arrangement. The iron piece 33 is disposed on the suspension arm member 34. The magnet 32 acts as a connection medium. In the event that the suspension arm member 34 is damaged, the only thing that has to be done is to remove the iron piece 33 from the magnet 32. The suspension arm member 34 is a suspension arm tuning fork, which is adhered at one end thereof with the probe 20 and is provided at other end thereof with the piezoelectric bimorph 31. The suspension arm member 34 is provided with two electrodes 341 and 342.

The signal feedback member 40 has a control box having a signal end which is connected with two electrodes 341 and 342 of the suspension arm member 34 via a pre-amplifier 42 for controlling the vibration of the piezoelectric bimorph 31. The vibration frequency is in the proximity of resonance frequency of the united body of the near-field optical fiber probe 20 and the suspension arm member 34. The control box 41 has other end for receiving the near-field optical signal which is obtained from the pointed end of the probe 20 and is transferred to a photoelectric multiplier 44 and a locked phase amplifier 43. The amplified signal is then transmitted to the control box 41 to serve as the image signal of the near-field optical microscope. The control box 41 further has one end forming a feedback control.

When the probe 10 comes in contract with the surface of a sample, the area of the thrust surface is greater as far as Van der walls and the equivalent load of the surface action force of the suspension arm member 34 are concerned. Under the resonance frequency, the energy stored by the probe 20 is greater, thereby making its amplitude greater than that of the shear force mode of the prior art. In the meantime, only one end of the suspension arm member 34 is attached to the probe 20, the entire rigidity is smaller. As a result, the oscillation sensitivity is better.

Figure 5:
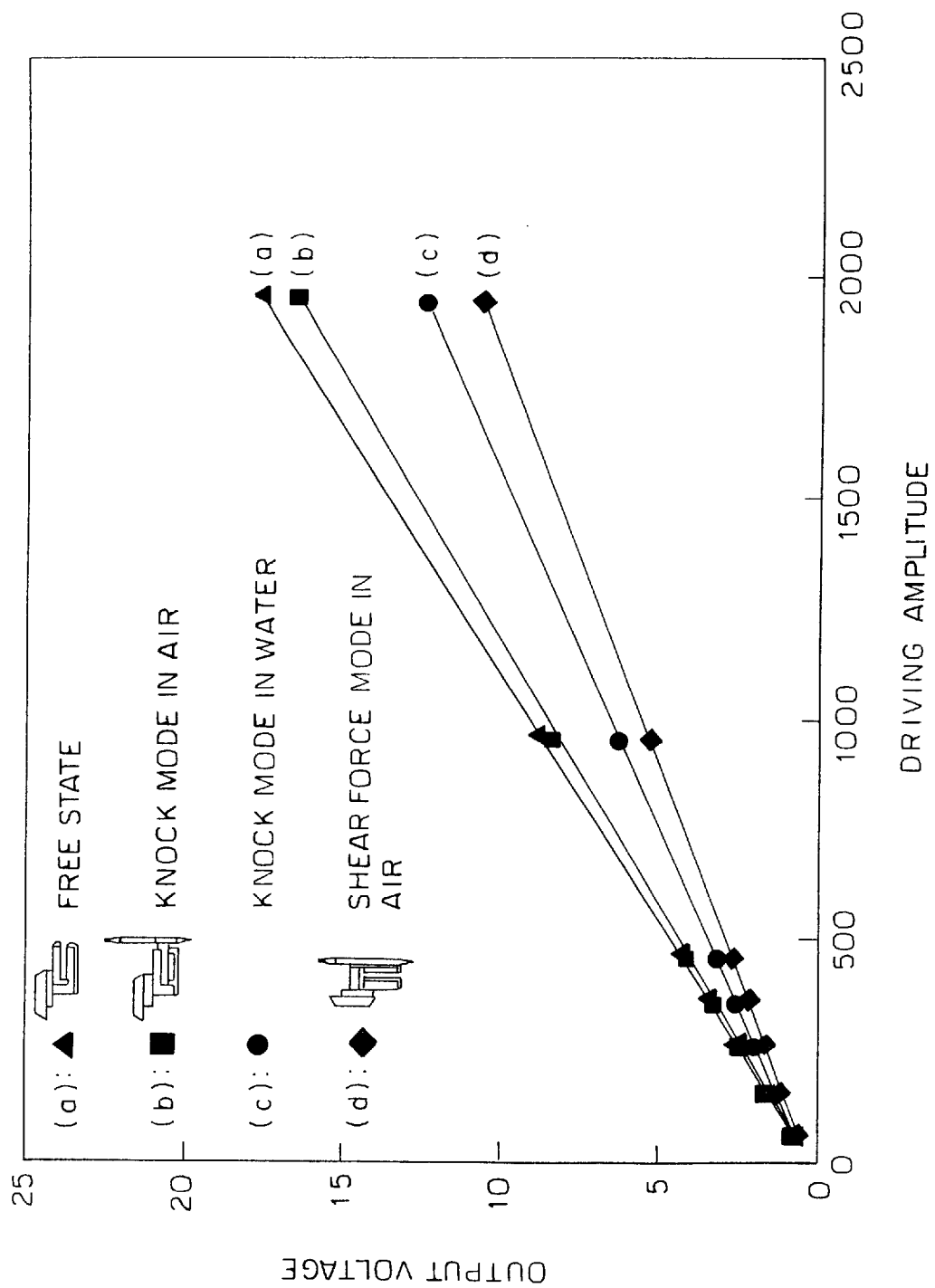
FIG. 5 shows a comparison of relationships between the output voltage and the driving amplitude of the prior art and the present invention under different environmental conditions.

As shown in FIG. 5, the prior art optical microscope and the optical microscope of the present invention are at work under different environmental conditions. The output voltage and the driving amplitude of the two electrodes 341 and 342 are compared. The line a is the curve of the oscillation member 30 of the present invention in the free state. The line b is the curve of the present invention in air. The line c is the curve of the present invention in water. The line d is the curve of the prior art in air. The voltage value of the present invention in air or water is greater than that of the prior art in air. The implication is that the present invention has a better sensitivity.

Figure 6:
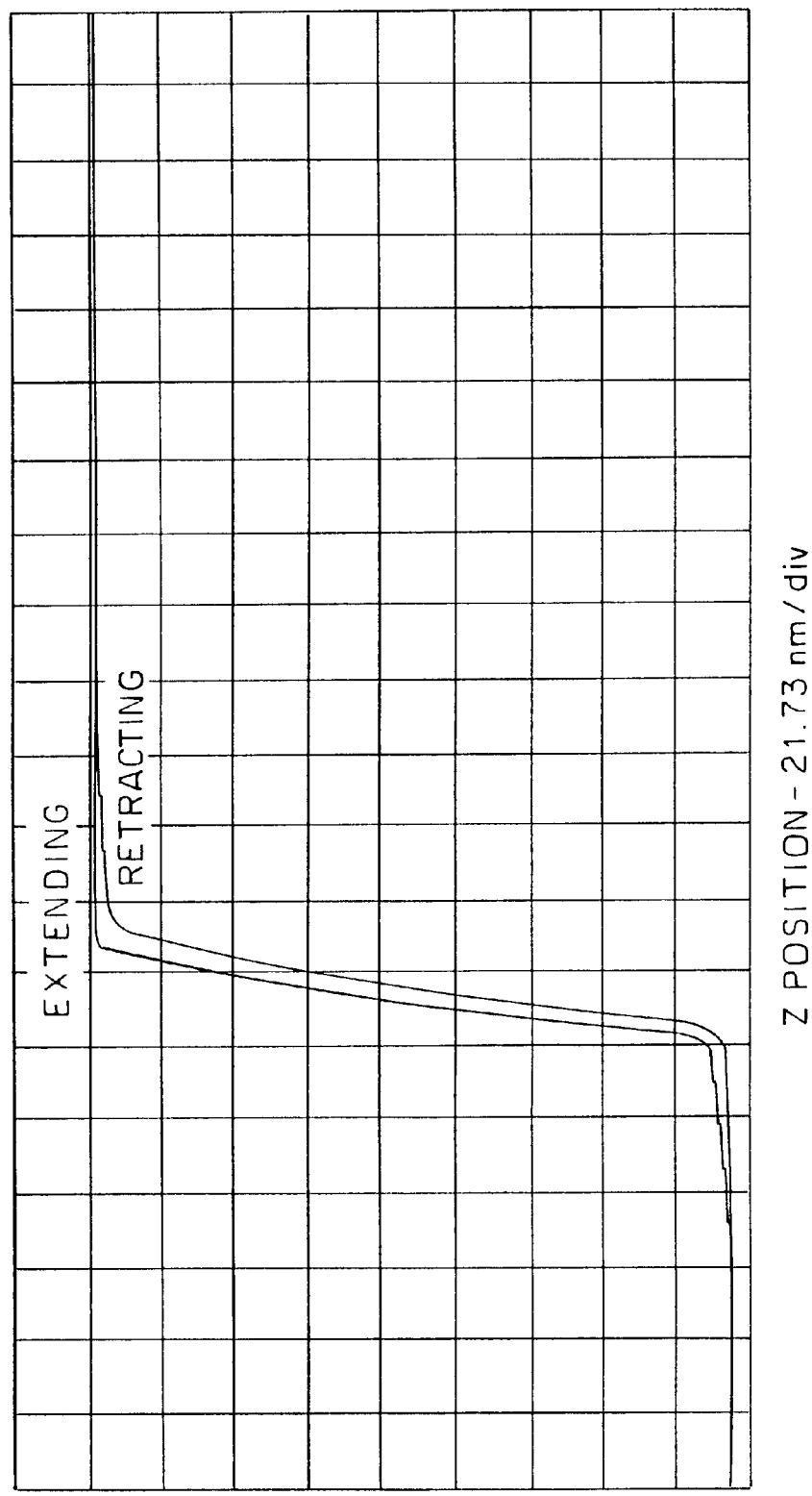
FIG. 6 shows a relationship between amplitude peak and probe distance sample height of the present invention in air and under resonance frequency.
Figure 7:
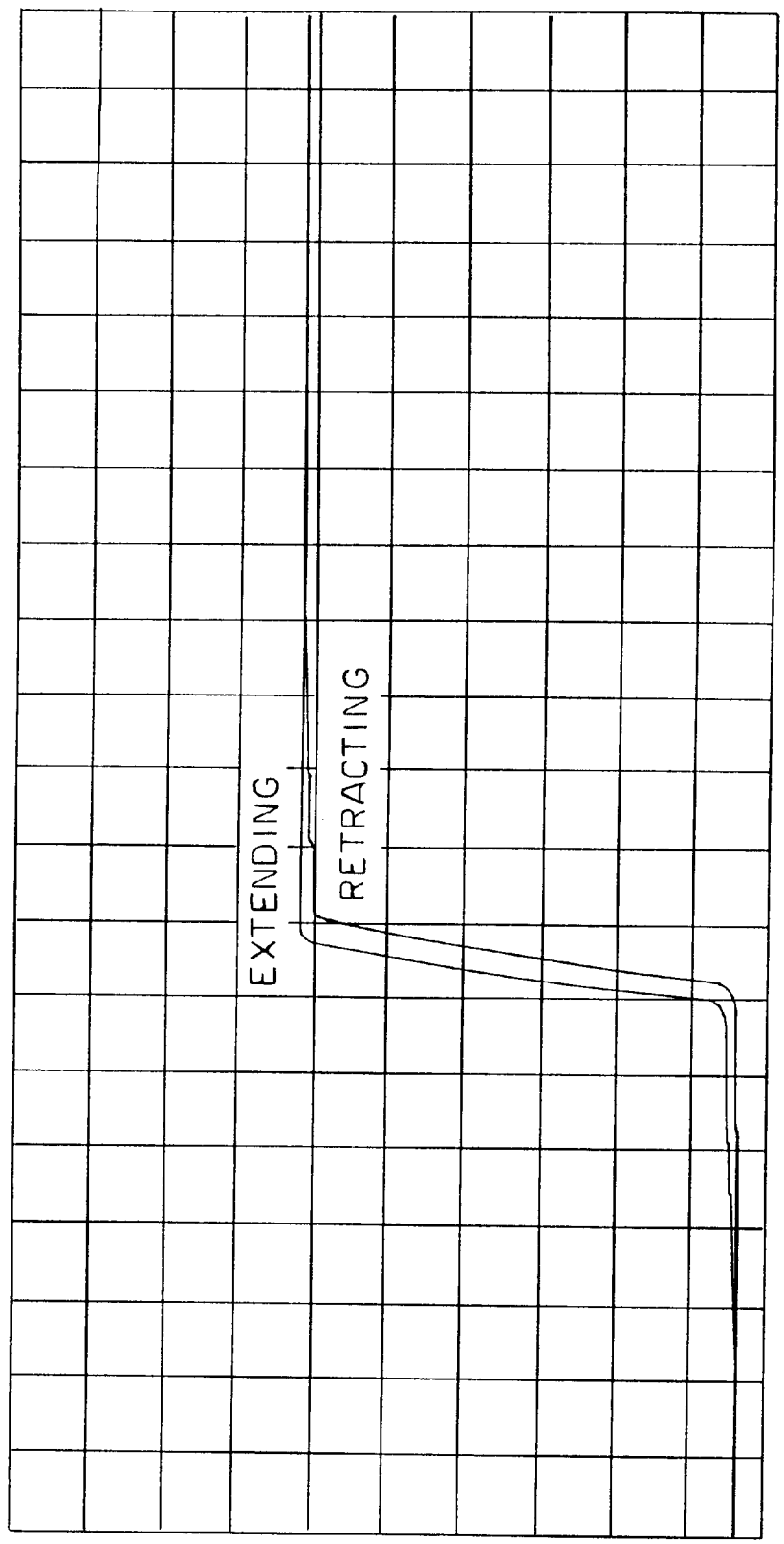
FIG. 7 shows a relationship between amplitude peak and probe distance sample height of the present invention in water and under resonance frequency.

As shown in FIG. 6, there is 19.5 nm in 10%–90% of the amplitude change zone of the present invention (interaction zone) in air and under the resonance frequency. The sensitivity (inclination) is 0.083 V/nm, which is four times greater than 0.020 V/nm of the prior art. Now referring to FIG. 7, the sensitivity of the present invention in water and under resonance frequency is 0.072 V/nm, which is 3.6 times greater than the sensitivity of the prior art. It is therefore readily apparent that the present invention has an excellent sensitivity and a precise feedback control.

The embodiment of the present invention described above is to be regarded in all respects as being merely illustrative and not restrictive. Accordingly, the present invention may be embodied in other specific forms without deviating from the spirit thereof. For example, the suspension arm member 34 of the present invention may be a suspension arm turning fork, a single suspension arm beam, or a doubly-armed suspension arm beam. In addition, the signal feedback member 40 may have a variety of peripheral equipments, depending on the feedback design.

What is claimed is:

1. A knock mode scanning near-field optical microscope comprising:
    a light source member;
    an optical fiber probe connected at one end thereof with said light source member such that other end of said optical fiber probe forms a near-field point source of light;
    an oscillation member having a piezoelectric ceramics, and a suspension arm member which has a longitudinal axis and is attached at one end thereof with said optical fiber probe so that the longitudinal axis of said suspension arm member is transverse to said optical fiber probe, said piezoelectric ceramics being disposed on said suspension arm member; and
    a signal feedback member using a harmonic wave signal to drive said piezoelectric ceramics so as to bring about a change in amplitude and phase of said optical fiber probe in order to result in a feedback control.

2. The optical microscope as defined in claim 1, wherein said suspension arm member is a suspension arm tuning fork.

3. The optical microscope as defined in claim 1, wherein said suspension arm member is a single suspension arm beam.

4. The optical microscope as defined in claim 1, wherein said suspension arm member is a doubly-armed suspension arm beam.

5. The optical microscope as defined in claim 1, wherein said piezoelectric ceramics is adhered to one end surface of a magnet whereby said magnet is provided in other end surface thereof with an iron piece which is attracted thereto and is then disposed on said suspension arm member.

6. The optical microscope as defined in claim 1, wherein said light source member is formed of a laser device emitting laser beam to said optical fiber probe via a shield and an optical fiber coupler.

7. The optical microscope as defined in claim 1, wherein said signal feedback member has a control box having a signal end which is connected with said suspension arm member via a pre-amplifier, said control box having other end receiving an optical signal from a pointed end of said optical fiber probe whereby said optical signal is guided to a photoelectric multiplier and then amplified by a locked phase amplifier before being transmitted to said control box, said control box further having other end which forms a feedback control.

8. A knock mode scanning near-field optical microscope comprising:
    a light source member;
    an optical fiber probe having one end connected with said light source member and another end that forms a near-field point source of light;
    an oscillation member having a piezoelectric ceramics, and a suspension arm member which has a longitudinal axis and at least one arm that extends along the longitudinal axis, said at least one arm having an end that is attached with said optical fiber probe so that the longitudinal axis is transverse to said optical fiber probe, said piezoelectric ceramics being disposed on said suspension arm member; and
    a signal feedback member using a harmonic wave signal to drive said piezoelectric ceramics so as to bring about a change in amplitude and phase of said optical fiber probe in order to result in a feedback control.

9. A knock mode scanning near-field optical microscope comprising:

a light source member;

an optical fiber probe having one end connected with said light source member and another end that forms a near-field point source of light, said optical fiber probe being operative to conduct light in a direction toward the other end;

an oscillation member having a piezoelectric ceramics, and a suspension arm member which has a longitudinal axis and at least one arm that extends along the longitudinal axis, said at least one arm having an end that is attached with said optical fiber probe so that the longitudinal axis is transverse to the direction of light conduction in said optical fiber probe, said piezoelectric ceramics being disposed on said suspension arm member; and a signal feedback member using a harmonic wave signal to drive said piezoelectric ceramics so as to bring about a change in amplitude and phase of said optical fiber probe in order to result in a feedback control.

10. The optical microscope as defined in claim 1 wherein the longitudinal axis of said suspension arm member is substantially perpendicular to said optical fiber probe.

11. The optical microscope as defined in claim 8 wherein the longitudinal axis of said suspension arm member is substantially perpendicular to said optical fiber probe.

12. The optical microscope as defined in claim 9 wherein the longitudinal axis of said suspension arm member is substantially perpendicular to the direction of light conduction in said optical fiber probe.

\* \* \* \* \*